Aug. 7, 1962    J. W. ARPIN    3,048,301
COVER STRUCTURE
Filed May 22, 1959
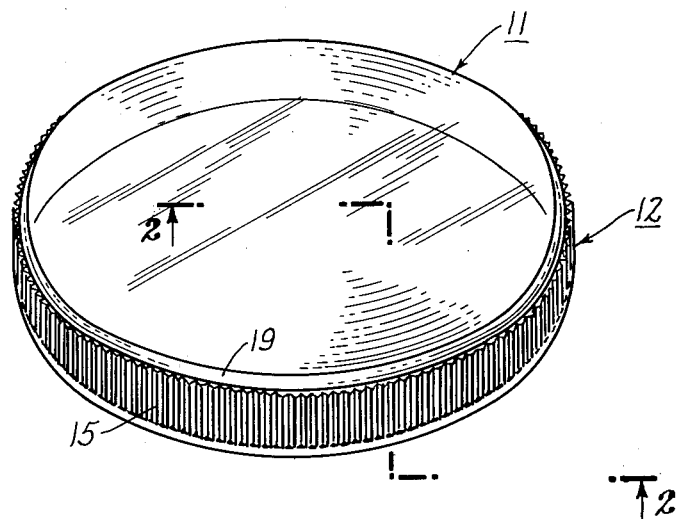
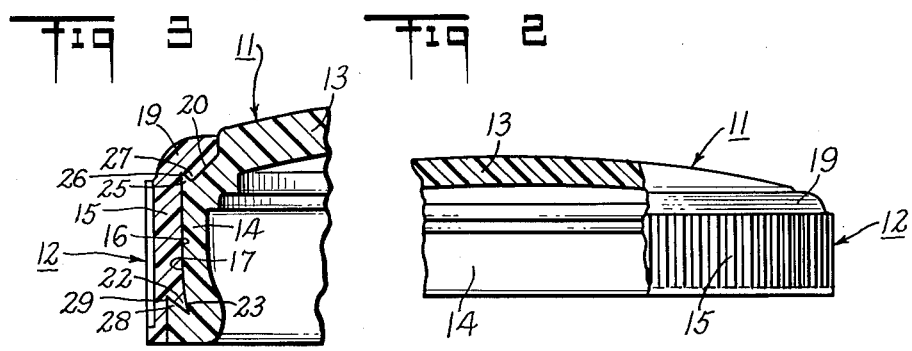
INVENTOR.
John W. Arpin
BY
ATTORNEY

United States Patent Office 3,048,301
Patented Aug. 7, 1962

3,048,301
COVER STRUCTURE
John W. Arpin, Bainbridge, N.Y., assignor to American Plastics Corporation, New York, N.Y., a corporation of New York
Filed May 22, 1929, Ser. No. 815,027
3 Claims. (Cl. 220—82)

This invention relates to a cover structure including a plastic window member and a peripheral plastic case therefor, and is directed more particularly to an improved interlocking arrangement for said window and case.

One type of window and case member is a bezel and lens which may be used as a cover for instrument dials. Other types of window case members are useful as clock facings or covers for automobile instrument panels.

For clarity of presentation, the interlocking arrangement will be discussed and illustrated by its arrangement in a bezel and lens member. However, as noted above, the interlock is equally applicable to other curved cover and case members.

The bezel and lens are comprised of at least two differently appearing thermoplastic materials with the bezel being an opaque, usually colored, thermoplastic material, and the lens a clear or transparent thermoplastic material.

Heretofore, cover structures including a plastic lens member have been formed by snapping or spinning in the clear or transparent lens into the previously formed metal bezel in order to effect a mechanical locking. Alternatively, the clear lens instead of being connected in any way to the bezel, has been held in place only when the bezel is connected with another member so as to hold the lens against the third member. Several parts of thermoplastic plastic may not be integrated or locked by fusing for the reason that the different materials (opaque and clear) would run together at their joining surfaces and result in smearing. Obviously, this is disadvantageous, for it is most desirable that the lens be transparent over the entire surface. On the other hand, there is a need for a plastic cover comprising a bezel and window of two different plastics held together so as to form a unitary structure.

The present invention is illustrated in connection with the formation of a circular bezel and a dome-shaped lens or cover, but it is to be understood that this choice is for purposes of illustration only and that this invention is equally adaptable to other contours.

An object of this invention is to provide a unitary cover structure comprising plastic bezel and a plastic lens member connected together so as to have improved resistance to the stresses and strains that tend to unlock the component parts. This and other objects and advantages of the present invention will become readily apparent when considering the accompanying drawing in which:

FIG. 1 is a camera view of a circular bezel and lens,

FIG. 2 is a partial elevational section through the line 2—2 of FIG. 1, and

FIG. 3 is a fragmentary view in section at the left side of FIGURE 1, so that FIGURES 2 and 3 together are an elevational section along line 2—2 of FIGURE 1.

Generally stated, the method of this invention comprises a double-injection molding operation wherein, first one component is molded (either the bezel or lens) and then the other component is molded in the presence of the first molded component.

Referring to the drawings, the two-piece plastic structure comprises a cover or lens member formed of one plastic material and a bezel 12 encircling the cover. The cover member includes a center lens portion 13 and a continuous flange 14 extending laterally from the center portion 13. The bezel 12 includes a flange or wall portion 15 extending about the flange 14 and having an interior surface 16 in contact with an exterior surface 17 of cover flange 14. The bezel 12 includes an inwardly projecting rib portion 19 integral with and extending about the upper peripheral edge of wall 15. Rib 19 overlies a portion of the cover flange at 20 in a zone located inwardly of the laterally extending surfaces 16 and 17. Lower rib 22 on flange 15 extends downwardly into recess 23 and extends inwardly of surface 16 and underlies a portion of the cover flange 14. The overlying rib 19 and the underlying rib 22 together prevent longitudinal separation of the cover member 11 and the bezel 12 in a direction coplanar with the flanges 14 and 15.

As will be subsequently described in greater detail, the plastic parts 11 and 12 are not fused together and particularly as the plastic parts are flexible the cover 11 and the bezel 12 could be separated by vertically moving one relative to the other if it were not for the overlying and underlying ribs 19 and 22. Obviously the ribs 19 and 22 may be on either flange 14 or 15 and overlying and underlying the other flange to hold the parts together and prevent longitudinal separation.

Relatively thin walled plastic structures of the type shown are flexible. For example, pressure applied to the top of the lens portion 13 or a force applied upwardly against the bottom of the lens 13 will tend to cause lateral separation of the flanges 14 and 15 in a direction normal to their planes, that is, normal to the contacting surfaces 16 and 17. Other forces tend to cause similar separation. For example, a force applied to the bezel 12 which tends to distort the shape of the structure and change its outline as viewed from above also will cause separation. In the present structure the cover flange 14 is provided with an upper, substantially V-shaped rib 25 which extends into a similarly shaped recess 26 in bezel 12. The rib 25 not only extends into the bezel 12 but extends behind the downwardly extending portion 27. The cover flange 14 is also provided with a lower V-shaped rib 28 which extends into a similarly shaped recess 29 in bezel flange 15. Ribs 25 and 28 not only extend into the bezel 12 but extend in a direction parallel to the flanges 14 and 15 preventing lateral separation of the bezel and covered member in a direction normal to the flanges 14 and 15. Thus, the ribs 19, 22, 25, and 28 together prevent separation of the bezel 12 and the cover 11 in any direction and hold the parts securely together.

The cover structure showing the drawings is preferably made by the double shot process in which one of the members 11 or 12 is formed by a suitable molding procedure, for example, by injection molding, and is then placed in a mold cavity so that the member and the surfaces of the mold cavity together define a cavity having the shape of the second member. For example, the bezel 12 can be readily formed by an injection molding procedure. This preform is then placed in a mold and a different color plastic is injected to form the cover 11. These plastics are a different color, for example, the cover 11 may be formed of clear or translucent plastic while the bezel 12 is preferably formed of an opaque, dark plastic. Any thermoplastic material may be used, such as cellulose acetate, butyrate or the like. Even though both the cover member and the bezel are formed of the same but different colored plastic material, there is no appreciable fusion between the parts and the parts could be readily separated if it were not for the interlocking of the ribs previously described.

The lens or cover structure may be fastened in place by any suitable means. The lens structure can be advantageously used on a panel covering one or more instruments and the instruments can be read through the clear portion 13. As shown, the lens cover is circular but obviously can be made in other shapes. Alternatively, the present structure can be used on flashlights and the inner surface of flange 14 can be threaded for attachment.

I claim:

1. A plastic cover structure comprising a plastic cover member of one color of plastic, said cover member having a central lens portion and a continuous depending wall portion extending downwardly from the peripheral edge of the lens portion, and a case of different color plastic extending about the periphery of the cover member and including an upright wall portion having an inner surface in contact with an outer surface of said depending wall portion, said upright wall portion terminating at its upper edge portion in an inwardly extending rib portion overlying said depending wall portion, a rib portion on one of said wall portions extending into and being received in a recess in the other wall portions, said ribs together preventing upward and downward movement of the case relative to the cover member, an upper rib and a lower rib each located on one of said wall portions and being received in a correspondingly shaped recess in the other of said wall portions, said upper rib and said lower rib each including a vertically extending, terminal portion and thereby preventing horizontal separation of the contacting surfaces of said wall portions.

2. A two-piece, plastic structure comprising a unitary plastic cover member having a central cover portion and a continuous, annular wall portion extending downwardly from the peripheral edge of said cover portion, and a unitary plastic case extending continuously, about the periphery of said cover member, said case including an annular wall portion having an inner surface in contact with an outer surface of the wall portion of said cover member, a first, annular rib portion integral with one of said wall portions overlying part of the other wall portion, and a second, annular rib portion integral with one of said wall portions underlying part of the other wall portion, said first and second rib portions together preventing movement of the case relative the cover member in a direction substantially parallel with the contacting wall portions, and a locking rib extending about the periphery of one of said wall portions, said locking rib extending vertically into and being received in a recess in the other of said wall portions, thereby preventing separation of cover member and case in a direction normal to the contacting wall portions.

3. A two-piece plastic cover structure comprising a unitary plastic cover member including a substantially horizontal, central lens portion and a flange extending about the periphery of the lens portion and integral therewith, said flange extending substantially vertically downward from the periphery of said lens portion, and a unitary plastic cover extending about the periphery of said cover member and including a continuous annular wall portion having an inner, substantially vertical surface in contact with an outer surface of said flange, the wall portion of the case terminating at its upper edge in an inwardly extending, annular rib overlying said flange, and an annular rib on the wall portion of the case below said first-mentioned rib underlying a portion of the depending flange, said ribs together preventing vertical movement of the case relative to the cover member, an upper locking rib extending completely about an upper portion of said flange and extending upwardly into a downwardly opening recess in said case, and a lower locking rib extending completely about a lower portion of said wall portion of the case and extending downwardly into an upwardly opening recess in said flange, each of said locking ribs preventing horizontal separation of said case and said flange.

References Cited in the file of this patent

UNITED STATES PATENTS

| 2,002,354 | Sighers | May 21, 1933 |
| 2,077,590 | Sighers | Apr. 20, 1937 |
| 2,719,403 | Gisiger | Oct. 4, 1955 |

FOREIGN PATENTS

| 229,648 | Switzerland | Feb. 1, 1944 |
| 283,123 | Switzerland | Sept. 16, 1952 |